(No Model.)

G. H. BENJAMIN.
ART OF MAKING TIN PLATES.

No. 472,691. Patented Apr. 12, 1892.

WITNESSES:

INVENTOR:

UNITED STATES PATENT OFFICE.

GEORGE H. BENJAMIN, OF NEW YORK, N. Y.

ART OF MAKING TIN PLATES.

SPECIFICATION forming part of Letters Patent No. 472,691, dated April 12, 1892.

Application filed November 11, 1890. Serial No. 371,020. (No model.)

*To all whom it may concern:*

Be it known that I, GEORGE H. BENJAMIN, of the city, county, and State of New York, have invented certain new and useful Improvements in the Art of Making Tin Plates, of which the following is a specification.

My invention relates to a step or steps in the art of making tin plates whereby the dirt, grease, and oxide of iron commonly found on the plate-blanks are readily and rapidly removed.

In the process of making tin plates it has heretofore been the practice to immerse the plates in a bath of sulphuric acid and water, allowing them to remain there a short time, and when removed therefrom rubbing them by hand labor with a cloth and sand to get rid of the dirt, grease, and oxide of iron commonly found on the plate. This process is repeated one or more times until the plates are thoroughly cleaned, and hence is very slow, tedious, and expensive. I have found that if the plate-blanks after coming from the rolling-mill in the usual "boxes" are introduced into an electric battery and a current of electricity transmitted through them they will be very rapidly and thoroughly cleaned by the decomposing action of the electric current.

In order to fully explain my method of carrying out my invention, I will refer to the accompanying drawings, in which similar letters indicate like parts.

Figure 1:
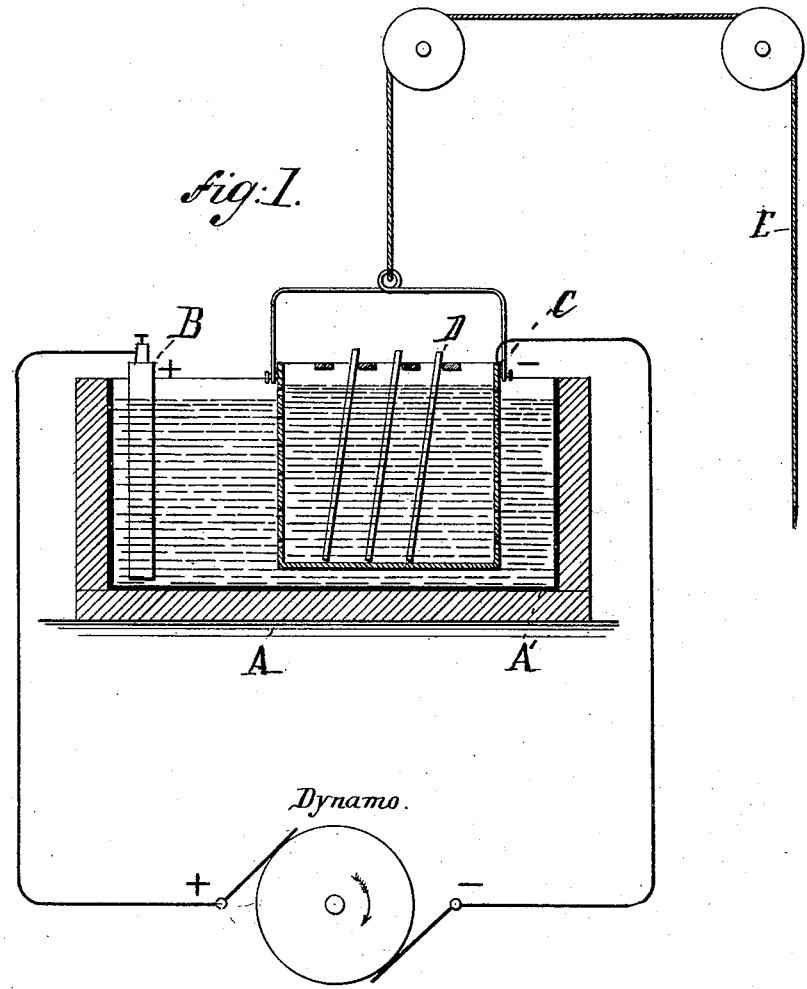
Figure 2:
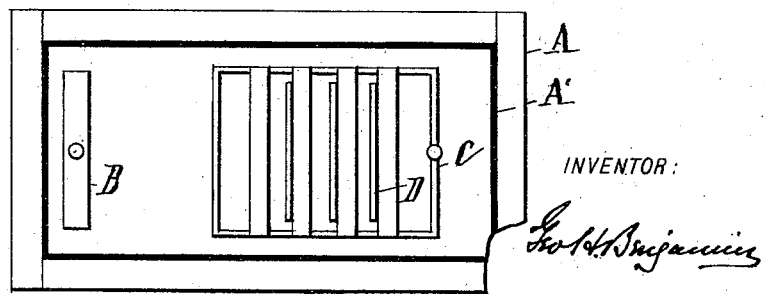

Figure 1 is a diagram showing an electric battery and the plate-blanks immersed therein connected to the dynamo electric machine. Fig. 2 is a plan view of the battery.

A indicates a battery-cell, which may be made of any suitable material, preferably of wood, having a rubber lining A'.

B is the positive electrode of the battery, which may be of any material, preferably of iron.

C is a crate formed into partitions for supporting the plate-blanks D to be cleaned, which as a whole form the negative electrode of the battery.

The crate C may be of conducting material or of insulating material provided with suitably-arranged conducting-strips, it being entirely immaterial how the crate is constructed, providing there are means for putting the plate-blanks into the electric circuit. If desired, the crate may be dispensed with.

E is a device by which the crate C may be readily lifted from the battery-cell. Any suitable electrolytic liquid may be employed in the battery, such as a solution of the sulphate of soda or a solution of sulphuric acid in water.

I carry out my improved process in the following manner: The plates being introduced into the battery-cell A, the current from the dynamo is turned on. As is well known, oxygen is set free from the positive electrode B and hydrogen from the negative electrode (plate-blanks) D. The hydrogen set free from the surface of the plate-blanks serves to reduce the oxides upon their surface and also to decompose any grease that may be present, and incidentally to cause any accumulation of dust or dirt that may be upon the blanks to drop off. Ordinarily it is sufficient to charge the plate-blanks in a solution of sulphuric acid and water, continuing the current from fifteen minutes to three-quarters of an hour. Where the plates are very much covered with grease, they may be immersed first in a solution of sulphate of soda, chloride of sodium, or any other solution of a neutral salt and charged for about fifteen minutes, and subsequently introduced into a solution of sulphuric acid in water and charged, as above described.

Where the plates are very dirty—that is, are covered with a great deal of rust—it may be necessary to continue the current while they are immersed in the sulphuric-acid bath for a longer period of time.

After charging the plates are removed from the battery-cell, rinsed with fresh water, then dried by rapid heating, after which they are ready for the tinning-bath.

I am aware that plate-blanks have heretofore been treated by locating them in a porous cup and immersing the cup in an electrolyte; but such I do not claim as my invention.

Having thus described my invention, I claim—

1. The herein-described improvement in the art of making tin plates, which consists in placing the plate-blanks to be cleaned within and in electrical contact with a vessel formed of perforated conducting material connected to the negative pole of the source of electricity, in immersing said vessel and plate-blanks in an electrolytic liquid, and while therein transmitting an electrical current through said plate-blanks in such a manner that hydrogen shall be set free from their surfaces.

2. The herein-described improvement in the art of making tin plates, which consists in placing the plate-blanks to be cleaned within and in electrical contact with a vessel formed of perforated conducting material connected to the negative pole of the source of electricity, in immersing said vessel and plate-blanks in an electrolytic liquid, and while therein transmitting an electrical current through said plate-blanks in such a manner that hydrogen shall be set free from their surfaces, and subsequently rinsing the said plate-blanks in clear water and drying them by rapid heating.

3. The herein-described improvement in the art of making tin plates, which consists in immersing the plate-blanks in an electrolytic liquid consisting of a solution of a neutral salt and while therein subjecting them to the action of an electric current, subsequently immersing said blanks in an electrolytic liquid having an acid reaction, and while therein subjecting them to the action of an electric current.

In witness whereof I have hereunto set my hand this 8th day of November, 1890.

GEORGE H. BENJAMIN.

Witnesses:
F. K. BUDD,
T. M. ROWLETTE.